(12) United States Patent
Goel et al.

(10) Patent No.: US 8,738,376 B1
(45) Date of Patent: May 27, 2014

(54) SPARSE MAXIMUM A POSTERIORI (MAP) ADAPTATION

(75) Inventors: Vaibhava Goel, Chappaqua, NY (US); Peder A. Olsen, Cortlandt Manor, NY (US); Steven J. Rennie, Millwood, NY (US); Jing Huang, Ossining, NY (US)

(73) Assignee: Nuance Communications, Inc., Burlington, MA (US)

( * ) Notice: Subject to any disclaimer, the term of this patent is extended or adjusted under 35 U.S.C. 154(b) by 385 days.

(21) Appl. No.: 13/284,373

(22) Filed: Oct. 28, 2011

(51) Int. Cl.
| | | |
|---|---|---|
| *G10L 21/02* | (2013.01) | |
| *G10L 19/14* | (2006.01) | |
| *G10L 19/00* | (2013.01) | |
| *G10L 15/20* | (2006.01) | |
| *G10L 15/06* | (2013.01) | |
| *G10L 17/00* | (2013.01) | |
| *G10L 13/00* | (2006.01) | |
| *G10L 21/00* | (2013.01) | |

(52) U.S. Cl.
USPC ........... 704/240; 704/205; 704/211; 704/233; 704/243; 704/246; 704/262; 704/263; 704/270; 704/270.1; 704/275; 704/226

(58) Field of Classification Search
CPC .................. G10L 2021/02; G10L 2021/0208; G10L 2021/02082; G10L 2021/02085; G10L 2021/02087; G10L 2021/0216; G10L 2021/02163; G10L 2021/02165; G10L 2021/02166; G10L 2021/02161; G10L 2021/02168
USPC ......... 704/226, 205, 211, 233, 235, 240, 243, 704/246, 262, 263, 270, 270.1, 275
See application file for complete search history.

(56) References Cited

U.S. PATENT DOCUMENTS

| | | | | |
|---|---|---|---|---|
| 5,960,397 | A * | 9/1999 | Rahim | 704/244 |
| 6,999,925 | B2 * | 2/2006 | Fischer et al. | 704/243 |
| 6,999,926 | B2 * | 2/2006 | Yuk et al. | 704/244 |
| 7,209,881 | B2 * | 4/2007 | Yoshizawa et al. | 704/233 |
| 2002/0091521 | A1 * | 7/2002 | Yuk et al. | 704/240 |
| 2003/0055640 | A1 * | 3/2003 | Burshtein et al. | 704/235 |
| 2007/0033028 | A1 * | 2/2007 | Yao | 704/233 |
| 2009/0198493 | A1 * | 8/2009 | Hakkani-Tur et al. | 704/235 |
| 2012/0010885 | A1 * | 1/2012 | Hakkani-Tur et al. | 704/243 |

OTHER PUBLICATIONS

Speech Enhancement by MAP Spectral Amplitude Estimation Using a Super-Gaussian Speech Model, T. Lotter, P. Vary, (EURASIP Journal on Applied Signal Processing, vol. 2005, No. 7, pp. 1110-1126, Jul. 2005.*

* cited by examiner

*Primary Examiner* — Edgar Guerra-Erazo
(74) *Attorney, Agent, or Firm* — Chapin IP Law, LLC

(57) ABSTRACT

Techniques disclosed herein include using a Maximum A Posteriori (MAP) adaptation process that imposes sparseness constraints to generate acoustic parameter adaptation data for specific users based on a relatively small set of training data. The resulting acoustic parameter adaptation data identifies changes for a relatively small fraction of acoustic parameters from a baseline acoustic speech model instead of changes to all acoustic parameters. This results in user-specific acoustic parameter adaptation data that is several orders of magnitude smaller than storage amounts otherwise required for a complete acoustic model. This provides customized acoustic speech models that increase recognition accuracy at a fraction of expected data storage requirements.

20 Claims, 13 Drawing Sheets input : Statistics $s^{MAP}$, $T$, model $\mu^{old}$, $v^{old}$ and penalty parameters $\tau, \lambda$
output: $\mu, v$ Compute $\alpha = 2\lambda/(T + \tau)$
Compute candidate answers: $\mu^{MAP}$, $v^{MAP}$ and $v^*$
$\mu^{MAP} \longleftarrow s_1^{MAP}$
$v^{MAP} \longleftarrow s_2^{MAP} - (s_1^{MAP})^2$
$v^* \longleftarrow v^{MAP} + (\mu^{old} - \mu^{MAP})^2$ Compute Lagrangian objectives:
$F_1 \longleftarrow \frac{(\mu^{old} - \mu^{MAP})^2 + v^{MAP}}{v^{old}} + \log(2\pi v^{old})$
$F_2 \longleftarrow \left(\frac{v^{MAP}}{v^{old}} + \log(2\pi v^{old})\right) + \alpha$
$F_3 \longleftarrow \log(2\pi e v^*) + \alpha$
$F_4 \longleftarrow \log(2\pi e v^{MAP}) + 2\alpha$ if $F_1$ *smallest* then $(\mu, v) \longleftarrow (\mu^{old}, v^{old})$
if $F_2$ *smallest* then $(\mu, v) \longleftarrow (\mu^{MAP}, v^{old})$
if $F_3$ *smallest* then $(\mu, v) \longleftarrow (\mu^{MAP}, v^*)$
if $F_4$ *smallest* then $(\mu, v) \longleftarrow (\mu^{MAP}, v^{MAP})$

*FIG. 2* input : Statistics $s^{MAP}$, $T$, model $\mu^{old}$, $v^{old}$ and penalty parameters $\tau, \lambda$
output: $\psi, p$ Compute $\alpha = 2\lambda/(T + \tau)$
Compute candidate answers: $\mu^{MAP}$, $v^{MAP}$ and $p^*$
$\mu^{MAP} \longleftarrow s_1^{MAP}$
$v^{MAP} \longleftarrow s_2^{MAP} - (s_1^{MAP})^2$
$p^* \longleftarrow \frac{1+\sqrt{1+(\psi^{old})^2 s_2^{MAP}}}{2 s_2^{MAP}}$ Compute Lagrangian objectives:
$F_1 \longleftarrow \frac{(\mu^{old}-\mu^{MAP})^2+v^{MAP}}{v^{old}} + \log(2\pi v^{old})$
$F_2 \longleftarrow \left(\frac{v^{MAP}}{v^{old}} + \log(2\pi v^{old})\right) + \alpha$
$F_3 \longleftarrow -2\psi^{old}\mu^{MAP} + p^* s_2^{MAP} + \frac{(\psi^{old})^2}{p^*} + \log\left(\frac{2\pi}{p^*}\right) + \alpha$
$F_4 \longleftarrow \log(2\pi e v^{MAP}) + 2\alpha$ if $F_1$ *smallest* then $(\psi, p) \longleftarrow (\mu^{old}/v^{old}, 1/v^{old})$
if $F_2$ *smallest* then $(\psi, p) \longleftarrow (\mu^{MAP}/v^{old}, 1/v^{old})$
if $F_3$ *smallest* then $(\psi, p) \longleftarrow (\mu^{old}/v^{old}, p^*)$
if $F_4$ *smallest* then $(\psi, p) \longleftarrow (\mu^{MAP}/v^{MAP}, 1/v^{MAP})$

*FIG. 3* input : Statistics $s^{MAP}$, $T$, model $\mu^{old}$, $v^{old}$ and penalty parameters $\tau, \lambda$
output: Candidate list $C$
Initialize: $C \leftarrow \emptyset$, $i \leftarrow 0$.
Compute $\alpha = 2\lambda/(T+\tau)$ and $v^* = (\mu^{old} - \mu^{MAP})^2 + v^{MAP}$
if $|\mu^{old} - \mu^{MAP}| \leq \frac{\alpha}{2} v^{old}$ and $\left|1 - \frac{v^*}{v^{old}}\right| \leq \alpha v^{old}$ then
$\quad C[i] = (\mu^{old}, v^{old}, F(\mu^{old}, v^{old}))$, $i \leftarrow i+1$
end
if $4\alpha v^* \leq 1$ then
$\quad v_{el} = \frac{1 - \sqrt{1 - 4\alpha v^*}}{2\alpha}$, $\mu_{el} = \mu^{old}$
$\quad$ if $v_{el} < v^{old}$ and $|\mu^{old} - \mu^{MAP}| \leq \frac{\alpha}{2} v_{el}$ then
$\quad\quad C[i] = (\mu_{el}, v_{el}, F(\mu_{el}, v_{el}))$, $i \leftarrow i+1$
$\quad$ end
end
$v_{eg} = \frac{\sqrt{1 + 4\alpha v^*} - 1}{2\alpha}$, $\mu_{eg} = \mu^{old}$
if $v_{eg} > v^{old}$ and $|\mu^{old} - \mu^{MAP}| \leq \frac{\alpha}{2} v_{eg}$ then
$\quad C[i] = (\mu_{eg}, v_{eg}, F(\mu_{eg}, v_{eg}))$, $i \leftarrow i+1$
end
if $\left|\frac{1}{v^{old}}\left(1 - \frac{v^{MAP}}{v^{old}}\right) - \frac{\alpha^2}{4}\right| \leq \alpha$ then
$\quad \mu_{le} = \mu^{MAP} + \frac{\alpha}{2} v^{old}$, $v_{le} = v^{old}$
$\quad$ if $\mu_{le} < \mu^{old}$ then
$\quad\quad C[i] = (\mu_{le}, v_{le}, F(\mu_{le}, v_{le}))$, $i \leftarrow i+1$
$\quad$ end
$\quad \mu_{ge} = \mu^{MAP} - \frac{\alpha}{2} v^{old}$, $v_{ge} = v^{old}$
$\quad$ if $\mu_{ge} > \mu^{old}$ then
$\quad\quad C[i] = (\mu_{ge}, v_{ge}, F(\mu_{ge}, v_{ge}))$, $i \leftarrow i+1$
$\quad$ end
end
(Continued In FIG. 5)

FIG. 4

(Continued From FIG. 4)

if $1 \geq \alpha(4 + \alpha)v^{MAP}$ then
$$v_{ll} = v_{gl} = \frac{1 - \sqrt{1 - \alpha(4+\alpha)v^{MAP}}}{\alpha(4+\alpha)/2}$$
$$\mu_{ll} = \mu^{MAP} + \frac{\alpha}{2}v_{ll}, \mu_{gl} = \mu^{MAP} - \frac{\alpha}{2}v_{gl}$$
  if $\mu_{ll} < \mu^{old}$ and $v_{ll} < v^{old}$ then
  | $C[i] = (\mu_{ll}, v_{ll}, F(\mu_{ll}, v_{ll})), i \leftarrow i + 1$
  end
  if $\mu_{gl} > \mu^{old}$ and $v_{gl} < v^{old}$ then
  | $C[i] = (\mu_{gl}, v_{gl}, F(\mu_{gl}, v_{gl})), i \leftarrow i + 1$
  end
end
if $\alpha \leq 4$ or ($\alpha > 4$ and $v^{MAP}\alpha(\alpha - 4) \leq 1$) then
$$v_{lg} = v_{gg} = \begin{cases} \frac{\sqrt{1 + v^{MAP}\alpha(4-\alpha)} - 1}{\alpha/2(4-\alpha)} & \text{if } \alpha < 4 \\ v^{MAP} & \text{if } \alpha = 4 \\ \frac{1 - \sqrt{1 - v^{MAP}\alpha(\alpha-4)}}{\alpha/2(\alpha-4)} & \text{if } \alpha > 4. \end{cases}$$
$$\mu_{gg} = \mu^{MAP} - \frac{\alpha}{2}v_{gg}, \mu_{lg} = \mu^{MAP} + \frac{\alpha}{2}v_{lg}$$
  if $\mu_{lg} < \mu^{old}$ and $v_{lg} > v^{old}$ then
  | $C[i] = (\mu_{lg}, v_{lg}, F(\mu_{lg}, v_{lg})), i \leftarrow i + 1$
  end
  if $\mu_{gg} > \mu^{old}$ and $v_{gg} > v^{old}$ then
  | $C[i] = (\mu_{gg}, v_{gg}, F(\mu_{gg}, v_{gg})), i \leftarrow i + 1$
  end
end

*FIG. 5* input : Statistics $s^{MAP}$, $T$, model $\mu^{old}$, $v^{old}$ and penalty parameters $\tau, \lambda$
output: Parameters $(\psi, p)$ attaining global minimum
Compute $\alpha = 2\lambda/(T + \tau)$ and $\psi^{old} = \mu^{old}/v^{old}$, $p^{old} = 1/v^{old}$
Compute MAP solution
$\mu^{MAP} = s_1^{MAP}, v^{MAP} = s_2^{MAP} - (s_1^{MAP})^2$,
$\psi^{MAP} = \mu^{MAP}/v^{MAP}, p^{MAP} = 1/v^{MAP}$ Compute $p_a = \alpha p^{MAP}/2$, $p_{aa} = \alpha p_a/2$, $\psi_a = \alpha \psi^{MAP}/2$
for $\epsilon \in \{-1, 1\}$ do
    for $\delta \in \{-1, 1\}$ do
        $\Delta = 1 + 2\epsilon\psi_a + \delta p_a - p_{aa}$
        $\psi = \frac{\psi^{MAP} - \epsilon p_a}{\Delta}, p = \frac{p^{MAP}}{\Delta}$
        if ($\epsilon\psi > \epsilon\psi^{old}$ and $\delta p < \delta p^{old}$ and $p > 0$) then
            return $(\psi, p)$
        end
    end
end

$p = p^{old}$
for $\epsilon \in \{-1, 1\}$ do
    $\psi = \frac{p^{old}}{p^{MAP}}(\psi^{MAP} - \epsilon p_a)$
    $\eta = (-s_2^{MAP} + 1/p + \psi^2/p^2)/2$
    $\nabla_{left} = \eta - \alpha/4, \nabla_{right} = \eta + \alpha/4$
    if ($\epsilon\psi > \epsilon\psi^{old}$ and $\nabla_{left} \leq 0$ and $\nabla_{right} \geq 0$) then
        return $(\psi, p)$
    end
end
(Continued In FIG. 7)

FIG. 6

(Continued From FIG. 6)

$\psi = \psi^{\text{old}}$
for $\delta \in \{-1, 1\}$ do
    $\zeta = 2\left((\psi^{\text{MAP}})^2 + p^{\text{MAP}} + \delta p_\alpha p^{\text{MAP}}\right)$
    if $\zeta > 0$ then
        $p = \dfrac{(p^{\text{MAP}})^2 + p^{\text{MAP}}\sqrt{(p^{\text{MAP}})^2 + 2\zeta\psi^2}}{\zeta}$
        $\eta = \mu^{\text{MAP}} - \psi/p$
        $\nabla_{\text{left}} = \eta - \alpha/2, \nabla_{\text{right}} = \eta + \alpha/2$
        if $(\delta p > \delta p^{\text{old}}$ and $\nabla_{\text{left}} \leq 0$ and $\nabla_{\text{right}} \geq 0$ and $p > 0)$ then
            return $(\psi, p)$
        end
    end
end
return $(\psi^{\text{old}}, p^{\text{old}})$

FIG. 7 input: Statistics s, $T_g$, model $\mu_g^{\text{old}}$, $v_g^{\text{old}}$ and penalty parameters $\tau_\mu$, $\tau_v$, $\alpha$, $\lambda_{0\mu}$, $\lambda_{0v}$, $\lambda_{1\mu}$, $\lambda_{1v}$ output: Global minimum $\mu_{\min}$, $v_{\min}$

Compute: $\mu_g^{\text{ML}} = s_1$, $v_g^{\text{ML}} = s_2 - s_1^2$ $$\mu_g^{\text{MAP}} = \frac{T_g \mu_g^{\text{ML}} + \tau_\mu \mu_g^{\text{old}}}{T_g + \tau_\mu}$$

$$v_g^{\text{MAP}} = \frac{\frac{T_g \tau_\mu}{T_g + \tau_\mu}(\mu_g^{\text{ML}} - \mu_g^{\text{old}})^2 + T_g v_g^{\text{ML}} + \tau_v v_g^{\text{old}}}{T_g + \tau_\mu + \alpha \tau_v}$$

$T_1 = (T_g + \tau_\mu)/2$, $T_2 = (T_g + \tau_\mu + \alpha \tau_v)/2$

Update: $\lambda_{1\mu} \leftarrow \frac{\lambda_{1\mu}}{\sqrt{v_g^{\text{old}}}}$, $\lambda_{1v} \leftarrow \frac{\lambda_{1v}}{v_g^{\text{old}}}$ $F_{\text{test}} = F(\mu_g^{\text{old}}, v_g^{\text{old}})$ Initialize: $(F_{\min}, \mu_{\min}, v_{\min}) = (F_{\text{test}}, \mu_g^{\text{old}}, v_g^{\text{old}})$ for $\delta \in \{-1, 1\}$ do

$\quad \mu_g = \mu_g^{\text{MAP}} - \frac{\delta \lambda_{1\mu} v_g^{\text{old}}}{2T_1}$ $\quad$ if $\delta(\mu_g - \mu_g^{\text{old}}) > 0$ then

$\quad\quad F_{\text{test}} = F(\mu_g, v_g^{\text{old}})$ $\quad\quad$ if $F_{\text{test}} < F_{\min}$ then

$\quad\quad\quad (F_{\min}, \mu_{\min}, v_{\min}) = (F_{\text{test}}, \mu_g, v_g^{\text{old}})$ $\quad$ end end

(Continued From FIG. 12)

for $\epsilon \in \{-1, 1\}$ do
$\quad v_g^* = \frac{T_1}{T_2}(\mu_g^{\text{old}} - \mu_g^{\text{MAP}})^2 + v_g^{\text{MAP}}$
$\quad$ if $1 + 4\epsilon v_g^* \lambda_{1v}/T_2 \geq 0$ then
$\quad\quad v_g = \frac{1 - \sqrt{1 + 4\epsilon v_g^* \lambda_{1v}/T_2}}{-2\epsilon \lambda_{1v}/T_2}$
$\quad\quad$ if $\epsilon(v_g - v_g^{\text{old}}) > 0$ then
$\quad\quad\quad F_{\text{test}} = F(\mu_g^{\text{old}}, v_g)$
$\quad\quad\quad$ if $F_{\text{test}} < F_{\text{min}}$ then
$\quad\quad\quad\quad (F_{\text{min}}, \mu_{\text{min}}, v_{\text{min}}) = (F_{\text{test}}, \mu_g^{\text{old}}, v_g)$
$\quad\quad\quad$ end
$\quad\quad$ end
$\quad$ end
end
for $\epsilon \in \{-1, 1\}$ do
$\quad \beta = \frac{\lambda_{1\mu}^2 - 4\epsilon T_1 \lambda_{1v}}{4T_1 T_2}$
$\quad$ if $1 - 4\beta v_g^{\text{MAP}} \geq 0$ then
$\quad\quad$ for $\delta \in \{-1, 1\}$ do
$\quad\quad\quad v_g = \begin{cases} v_g^{\text{MAP}} & \text{if } \beta = 0 \\ \frac{1 - \sqrt{1 - 4\beta v_g^{\text{MAP}}}}{2\beta} & \text{if } \beta \neq 0 \end{cases}$
$\quad\quad\quad \mu_g = \mu_g^{\text{MAP}} - \delta \frac{\lambda_{1\mu}}{2T_1} v_g$
$\quad\quad\quad$ if $\delta(\mu_g - \mu_g^{\text{old}}) > 0$ and $\epsilon(v_g - v_g^{\text{old}}) > 0$ then
$\quad\quad\quad\quad F_{\text{test}} = F(\mu_g, v_g)$
$\quad\quad\quad\quad$ if $F_{\text{test}} < F_{\text{min}}$ then
$\quad\quad\quad\quad\quad (F_{\text{min}}, \mu_{\text{min}}, v_{\text{min}}) = (F_{\text{test}}, \mu_g, v_g)$
$\quad\quad\quad\quad$ end
$\quad\quad\quad$ end
$\quad\quad$ end
$\quad$ end
end

*FIG. 13*

SPARSE MAXIMUM A POSTERIORI (MAP) ADAPTATION

BACKGROUND

The present disclosure relates to speech recognition, and particularly to acoustic models used within an automatic speech recognition system.

Speech recognition or, more accurately, automatic speech recognition, involves a computerized process that converts spoken words to text. There are many uses for speech recognition, including speech transcription, speech translation, controlling devices and software applications by voice, call routing systems, voice search of the Internet, etc.

Speech recognition systems can optionally be paired with spoken language understanding systems to extract meaning and/or commands to execute when interacting with machines. Speech recognition systems are highly complex and operate by matching an acoustic signature of an utterance with acoustic signatures of words in a statistical language model. Thus, both acoustic modeling and language modeling are important in the speech recognition process. Acoustic models are created from audio recordings of spoken utterances as well as associated transcriptions. The acoustic model then defines statistical representations of individual sounds for corresponding words. A speech recognition system uses the acoustic model to identify a sequence of sounds, while the speech recognition system uses the statistical language model to identify possible word sequences from the identified sounds. Accuracy of acoustic models is typically better when the acoustic model is created from a relative large amount of training data. Likewise, accuracy of acoustic models is typically better when acoustic models are trained for a specific speaker, instead of being trained for the general populous of speakers.

SUMMARY

There is a significant shift in automatic speech recognition to using hosted applications in which a server or server cluster processes spoken utterances of multiple speakers, such as callers and users. Such a shift is effective for voice search applications and dictation applications, especially when using mobile phones and other mobile devices that may have relatively smaller processing power. Such hosted applications aim to make speech recognition as user-specific as possible to increase recognition accuracy. Callers and users of hosted speech recognition applications can be identified by various means. By knowing a user/caller ID, a speech recognition system can change its statistical models to be as user-specific as possible. This includes user-specific acoustic models.

Creation or estimation of an acoustic model conventionally depends on a type and amount of training data available. With relatively large amounts of training data (100-10,000 hours), the training is typically done with Maximum Likelihood method of estimation or discriminative training techniques. This results in acoustic models that frequently include $10^5$-$10^6$ gaussian components or acoustic parameters. Such large acoustic models, however, cannot be estimated from small amounts of data. It is common for speech recognition systems to have access to a few minutes or a few hours of recorded audio from a particular identified speaker, but not the amounts of training data needed for creating a new acoustic model for each speaker. Generic acoustic models, however, are available. Such generic or baseline acoustic speech models can be created from training data compiled from one or more speakers. With relatively small amounts of training data (ten seconds to ten minutes), linear regression methods and regression transforms are conventionally employed to adapt such a baseline acoustic speech model to a specific speaker. While multiple class-based linear transforms can be used as the amount of training data grows, this solution is still less effective, in part because of the inability of linear transforms to completely change an entire acoustic model.

One challenge or problem with changing the acoustic model completely is that the typical acoustic model is huge in terms of storage space requirements. Accordingly, maintaining a distinct and whole acoustic model for each user requires tremendous amounts of available data storage (millions of acoustic parameters per acoustic model multiplied by millions of users). Storing only modifications to a baseline acoustic model for a specific user can have the same storage space problems. For example, if a given adaptation of a generic acoustic model included saving changes/perturbations to every acoustic component or acoustic parameter of the acoustic model, then there would be as many modified acoustic parameters to store as there are acoustic parameters in the original acoustic model, which would be huge (millions of changes to store) and tantamount to having distinct user-specific acoustic models.

Techniques disclosed herein include use a Maximum A Posteriori (MAP) adaptation process that imposes sparseness constraints to generate acoustic parameter adaptation data for specific users based on a relatively small set of training data. The resulting acoustic parameter adaptation data identifies changes for a relatively small fraction of acoustic parameters from a baseline acoustic model instead of changes to all acoustic parameters. This results in user-specific acoustic parameter adaptation data that is several orders of magnitude smaller than storage requirements for a complete acoustic model.

MAP adaptation is a powerful tool for building speaker-specific acoustic models. Conventional speech applications typically use acoustic models with millions of acoustic parameters, and serve millions of users. Storing a customized acoustic model for each user is costly in terms of data storage. Discoveries herein identify that speaker-specific acoustic models are similar to a baseline acoustic model being adapted. Moreover, techniques herein include imposing sparseness constraints during a MAP adaptation process. Such constraints limit movement of statistical differences between the baseline acoustic model representing changes to the baseline model that customize the baseline model to a specific user. Accordingly, only a relatively small number of acoustic parameters from the baseline acoustic model register a change that will be saved as part of acoustic parameter adaptation data. A resulting benefit is significant data storage savings as well as improving the quality and accuracy of the acoustic model. Imposing sparseness constraints herein includes using penalties or regularizers to induce sparsity. Penalties can be used with parameters using moment variables and/or exponential family variables. Executing sparse MAP adaptation as disclosed herein can result in up to about 95% sparsity with negligible loss in recognition accuracy. By removing small differences, identified as "adaptation noise," sparse MAP adaptation can improve upon MAP adaptation. For example, sparse MAP adaptation can reduce MAP word error rate by about 2% relative to about 89% sparsity. In other words, the sparse MAP adaptation techniques disclosed herein generate modification data used to load user-specific acoustic models during actual speech recognition using a fraction of storage space and while simultaneously increasing accuracy.

One embodiment includes an acoustic model adaptation manager that executes an acoustic model adaptation process or an acoustic model adaptation system. The acoustic model adaptation manager accesses acoustic data of a first speaker, such as by referencing a user profile. The acoustic data of the first speaker can be a collection of recorded utterances spoken by the first speaker, such as from previous calls or queries. The acoustic model adaptation manager accesses a baseline acoustic speech model of an automated speech recognition system. The baseline acoustic speech model has a plurality of acoustic parameters used in converting spoken words to text. For example, the baseline acoustic speech model can be an initial acoustic model such as one trained for multiple speakers in general.

The acoustic model adaptation manager estimates, using a maximum a posteriori probability process, statistical changes to acoustic parameters of the baseline acoustic speech model that improve speech recognition accuracy of the acoustic model when executing speech recognition on utterances of the first speaker. This includes using the maximum a posteriori probability process by comparing an analysis of the acoustic data of the first speaker to the plurality of acoustic parameters of the baseline acoustic speech model, such as to identify statistical differences. Using the maximum a posteriori probability process also includes restricting estimation of statistical changes such that an amount of acoustic parameters from the baseline acoustic speech model that have an estimated statistical change is less than a total number of acoustic parameters included in the baseline acoustic speech model. In other words, the restriction introduced sparsity, which limited the number of acoustic parameters registering a change, or registering moving sufficiently to be identified as having a change. The acoustic model adaptation manager can then store changes to a set of acoustic parameters corresponding to acoustic parameters from the baseline acoustic speech model that have an estimated statistical change. The changes are stored as acoustic parameter adaptation data linked to the first speaker. With acoustic parameter adaptation data associated with a specific user profile, when an utterance from that specific speaker is received as speech recognition input, the acoustic model adaptation manager can then load the baseline acoustic speech model modified using the acoustic model adaptation data and then continue with speech recognition using the modified acoustic model. Additional audio data from the specific user can be recorded and collected and then used to update the acoustic model adaptation data using the sparse MAP analysis.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: accessing acoustic data of a first speaker, the acoustic data of the first speaker being a collection of recorded utterances spoken by the first speaker; accessing a baseline acoustic speech model of an automated speech recognition system, the baseline acoustic speech model having a plurality of acoustic parameters used in converting spoken words to text; estimating, using a maximum a posteriori probability process, statistical changes to acoustic parameters of the baseline acoustic speech model that improve speech recognition accuracy of the acoustic model when executing speech recognition on utterances of the first speaker, wherein using the maximum a posteriori probability process includes comparing an analysis of the acoustic data of the first speaker to the plurality of acoustic parameters of the baseline acoustic speech model, wherein using the maximum a posteriori probability process includes restricting estimation of statistical changes such that an amount of acoustic parameters from the baseline acoustic speech model that have an estimated statistical change is less than a total number of acoustic parameters included in the baseline acoustic speech model; and storing changes to a set of acoustic parameters corresponding to acoustic parameters from the baseline acoustic speech model that have an estimated statistical change, the changes being stored as acoustic parameter adaptation data linked to the first speaker. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations.

As discussed above, techniques herein are well suited for use in software applications supporting speech recognition. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIG. 2 is an example algorithm for sparse MAP adaptation with $l_0$ penalty on moment variables according to embodiments herein.

FIG. 3 is an example algorithm for sparse MAP adaptation with $l_0$ penalty on exponential family variables according to embodiments herein.

FIGS. 4-5 is an example algorithm for sparse MAP adaptation with $l_1$ penalty on moment variables according to embodiments herein.

FIGS. 6-7 is an example algorithm for sparse MAP adaptation with $l_1$ penalty on exponential family variables according to embodiments herein.

FIGS. 12-13 is an example algorithm for sparse MAP adaptation according to embodiments herein.

DETAILED DESCRIPTION

Figure 1:
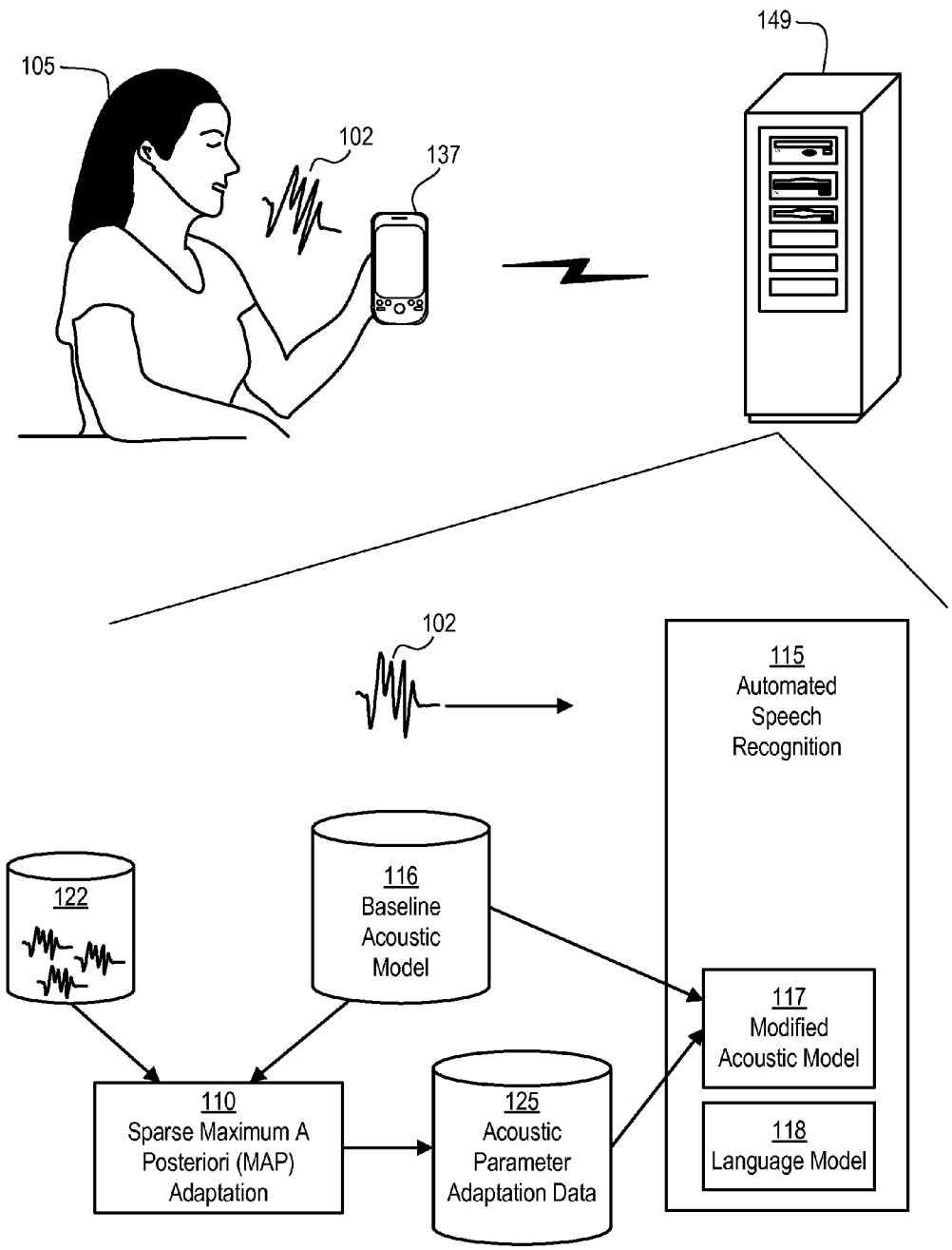
FIG. 1 is a block diagram of a system for hosted speech recognition and acoustic model adaptation according to embodiments herein.

Techniques disclosed herein include using a Maximum A Posteriori (MAP) adaptation process that imposes sparseness constraints to generate acoustic parameter adaptation data for specific users based on a relatively small set of training data. The resulting acoustic parameter adaptation data identifies changes for a relatively small fraction of acoustic parameters from a baseline acoustic speech model instead of changes to all acoustic parameters. This results in user-specific acoustic parameter adaptation data that is several orders of magnitude smaller than storage requirements for a complete acoustic model.

Hosted or server-based speech recognition applications typically include functionality to record and compile audio data from users. Such audio data can be stored as part of a user profile for identified users. Users can be identified in various ways, such as by login, caller id, IP address, etc. Audio data stored and associated with a particular user can be used for customizing an acoustic model of a speech recognition system for that particular user. With a customized acoustic model retrievable, in response to a subsequent call or spoken utterance from this particular user, the system can load user-specific data, and then change or modify the acoustic model (and/or language model) based on the user-specific data retrieved. In other words, a given server loads a generic acoustic model and retrieves user-specific acoustic model adaptation data. The generic acoustic model is then customized or modified based on the retrieved user-specific acoustic model adaptation data, thereby resulting in a user-specific acoustic model.

Generating the acoustic parameter adaptation data involves using the sparse MAP adaptation process. This essentially involves estimating a perturbation to an entire acoustic model, but estimating judiciously so that perturbations/changes are kept as sparse as possible or desired. A few significant perturbations can be identified that provide a best result (the changes most likely to result in improved accuracy), and then storing only these few perturbations that provide the best results with the lowest increase of storage space required. Such techniques improve acoustic model profiles resulting in better customization than conventional linear transforms, yet without incurring a substantial increase in the size of the footprint of the profile being stored.

The differences stored (acoustic parameter adaptation data) have a substantially smaller file size than those required to define an entirely new user-model. For example, if a given baseline acoustic speech model has one million acoustic parameters, storing differences for each of those one million parameters yields one million perturbations. Storing those one million perturbations would be approximately equivalent to storing a separate acoustic model. Techniques herein, however, can make the perturbation factor as sparse as possible while still providing lower word error rates in word recognition In a specific example, this can mean storing about 100 or 1000 perturbations per user. By storing perturbations for less than one percent of the acoustic parameters of the baseline acoustic model, user-specific profiles can easily scale to millions of users, yet what is stored provides results comparable to storing a different acoustic model for each user.

In general, the process of creating the acoustic parameter adaptation data is data-driven. The system receives and/or accesses some amount of acoustic data from multiple users. This acoustic data from each user is analyzed to identifying a subset of those million acoustic parameters from the baseline acoustic model that are most likely important to make the acoustic model specific to a corresponding user. Changing certain parameters can affect accuracy more than other parameters. Note that the specific parameters identified as important to a first identified user may be significantly different from those specific parameters identified as important to a second user. By way of a non-limiting example, a first user may have a very strong accent as compared to a second user. As such, modifying certain acoustic parameters to account for the strong accent and accurately recognize speech from the first user may be different acoustic parameters than specific parameters of the second user that should be modified for accurate speech recognition of the second user.

In some embodiments, for each given user, the system may store an approximately equal number of perturbations (perhaps 100 or 1000 perturbations), though each identified parameter having a perturbation can be different as compared to other users. That is, the perturbations could be in completely different places in the acoustic model from user to user. Such differences depend on what is identified as most important relative to a given user to improve speech recognition.

Identifying which parameters are most important includes determining which parameters are important using essentially the same process used to train the baseline model. In one embodiment, collected audio data can be used to modify the baseline acoustic model to maximize the likelihood of data observed by changing the acoustic parameters. For example, for a given starting point, as evaluated with given acoustic data from the user, there is a particular point that maximizes the likelihood of the acoustic data from that user. Moving all parameters, however, would result is movement of a million or so parameters, that is, each parameter would want to move from its starting position. Techniques herein then insert a penalty term on the parameter difference calculations to minimize movement. Maximizing likelihood can mean allowing all parameters to move, but here there is a penalty associated with movement. The system then jointly maximizes the likelihood while minimizing the penalty term. Note that not all penalties may enforce a sparsity.

FIG. 1 depicts a diagram for hosted speech recognition and acoustic model adaptation according to embodiments herein. Audio data 122 from a user 105 is collected over time. Audio data 122 can include recorded utterances and queries compiled over time. Such audio data 122 can include raw audio spoken by the user. An automated speech recognition system 115 uses a modified acoustic speech model 117 and a language model 118 to analyze spoken utterances and convert those spoken utterances to text. A sparse MAP adaptation engine 110 operates by accessing audio data 122 for a specific speaker (such as user 105), as well as accessing baseline acoustic model 116. The system executes a sparse MAP adaptation analysis that results in a relatively small set of changes to the baseline acoustic speech model 116. This small set of changes is then stored as acoustic parameter adaptation data 125 and linked to a specific user or user profile. With acoustic parameter adaptation data 125 generated, the automated speech recognition system 115 can then recognize speech of user 105 using modified (customized) acoustic model 117.

Accordingly, in one example scenario, user 105 speaks an utterance 102 as input to speech recognition system 115. Utterance 102 can be recorded by a personal electronic device, such as mobile telephone 137, and then transmitted to remote server 149. At remote server 149, the speech recognition system 115 identifies that utterance 102 corresponds to user 105. In response, speech recognition system 115 loads baseline acoustic model 116 and loads acoustic parameter adaptation data 125, and uses acoustic parameter adaptation data 125 to modify the baseline acoustic model 116, thereby resulting in modified acoustic model 117. With modified acoustic model 117 ready, speech recognition system 115 uses modified acoustic model 117 and language model 118 to convert utterance 102 to text with improved accuracy.

Now, to describe MAP adaptation and sparse MAP adaptation more specifically, MAP adaptation uses the conjugate prior distribution (Dirichlet for mixture weights, Normal distribution for mean, and Wishart for covariances) as a Bayesian prior to re-estimate, the parameters of the model starting from a speaker independent or canonical acoustic model. The number of parameters estimated can be very large compared to the amount of data, and although the Bayesian prior provides smoothing, small movements of model parameters can still constitute noise. With techniques herein, removing the small differences between a generic acoustic model and a speaker-specific acoustic model, stored information can be compressed while word error rate is reduced by identifying sparse differences.

Parameter differences are made sparse by employing sparsity inducing penalties, and in particular employing $l_q$ penalties. For $l_0$, the counting "norm"

$$\|x\|_0 = \#\{i : x_i \neq 0\}. \tag{1}$$

is used; and for q=1 the regular norm:

$$\|x\|_1 = \Sigma_i |x_i|.$$

In general, there are conventional techniques to minimize smooth convex functions with an additional $\|x\|_1$ term. The $\|x\|_0$ term, in contrast, is not convex. Convex problems with an additional $l_0$ penalty are known in general to be NP-hard.

Regarding choice of parameterization, when introducing sparsity in the parameter difference, the choice of parameters, $\theta$, can affect the outcome. For example, when writing a log likelihood function itself using different variables, the resulting sparsity can be relative to this choice of variables. For computational efficiency, it is helpful to match the parameterization to the way the model is stored and used in the speech recognition engine itself. Example embodiments herein describe two popular parameter choices: moment variables and exponential family variable. These are basically two ways to represent an acoustic model. Note that additional parameter choices can be made while keeping within the scope of this disclosure.

Moment variables can be represented with the parameters being $\xi=(\upsilon,^\mu)$. The collection of variables for all mixtures is referred to as $\Xi=\{\omega_g, \mu_g, v_g\}_{g=1}^G$, where $\omega_g$ are the mixture weights, and G is the total number of gaussians in the acoustic model.

Exponential family variables can be represented using $$\theta = \begin{pmatrix} \frac{\mu}{v} \\ -\frac{1}{2v} \end{pmatrix} = \begin{pmatrix} \psi \\ -\frac{1}{2}p \end{pmatrix}.$$

This representation is especially efficient for likelihood computations. For this parameterization, this collection of variables is referred to as $\theta=\{\omega_g, \psi_g, p_g\}_{g=1}^G$.

For normal distribution as an exponential family a one-dimensional gaussian can be written as:

$$\mathcal{N}(x; \mu, v) = \frac{e^{-\frac{(x-\mu)^2}{2v}}}{\sqrt{2\pi v}} = \frac{e^{\theta^\top \phi(x)}}{Z(\theta)}. \tag{2}$$

With the features $\phi$ and parameters $\theta$ chosen as $$\phi(x) = \begin{pmatrix} x \\ x^2 \end{pmatrix} \theta = \begin{pmatrix} \frac{\mu}{v} \\ -\frac{1}{2v} \end{pmatrix} = \begin{pmatrix} \psi \\ -\frac{1}{2}p \end{pmatrix}, \tag{3}$$

the resulting log-partition function is $$\log Z(\theta) = \frac{1}{2}\left(\log(2\pi) - \log(p) + \frac{\psi^2}{p}\right). \tag{4}$$

In the exponential family formulation, the maximum log likelihood objective function has the simple form $$L(\theta) = s^\top \theta - \log Z(\theta) \tag{5}$$

where s is the sufficient statistics. The Kullback-Leibler (KL) divergence between two one-dimensional normal distributions can be used later, and is given by the following formulas:

$$D(f \| g) = \int f(x) \log\left(\frac{f(x)}{g(x)}\right) dx \quad (6)$$

$$= \frac{1}{2}\left(\frac{v_f}{v_g} - 1 - \log\left(\frac{v_f}{v_g}\right) + \frac{(\mu_f - \mu_g)^2}{v_g}\right) \quad (7)$$

$$= \frac{(v_f - v_g)^2}{4v_g^2} + \frac{(\mu_f - \mu_g)^2}{2v_g} + \ldots \quad (8)$$

$$= \log\frac{Z(\theta_g)}{Z(\theta_f)} + (\theta_f - \theta_g)^\top E_{\theta_f}[\phi(x)]. \quad (9)$$

Equation (8) shows all the second order terms of the Taylor expansion for the KL-divergence. The omission of the cross term $(\mu_f - \mu_g)(v_f - v_g)$ means that the KL-divergence can essentially be thought of as a weighted squared error of the parameters $\xi$. The expected value of the features in (9) is given by $$E_\theta[\phi(x)] = \begin{pmatrix} \mu \\ v + \mu^2 \end{pmatrix} = \begin{pmatrix} \frac{\psi}{p} \\ \frac{\psi^2 + p}{p^2} \end{pmatrix}. \quad (10)$$

Maximum A Posteriori (MAP) adaptation can estimate distributions based on empirical data. Let $\mathcal{H} = \{\pi, A, \Xi\}$ be a Hidden Markov Model (HMM), where $\pi$ is the initial state distribution, A is the transition matrix and $\Xi$ is the acoustic model, where G is the total number of gaussians. The likelihood of the training data can then be written $$P(X|\mathcal{H}) = \sum_\sigma \pi_{\sigma_0} \prod_t \alpha_{\sigma_{t-1}\sigma_t} \sum_{g \in \mathcal{G}_{\sigma_t}} w_g \mathcal{N}(x_t; \mu_g, v_g), \quad (11)$$

where the outer sum is over all possible state sequences $\sigma$, and the inner sum is over the mixture components corresponding to the state $\sigma_t$. For the acoustic model parameters, the following prior distribution is provided $$P(\Xi) = \prod_{g=1}^G P(\mu_g, v_g | \mu_g^{old}, v_g^{old}, \tau_\mu, \tau_\nu) P(\omega_g | \omega_g^{old}, \tau_\omega), \quad (12)$$

where $\tau_\mu, \tau_\nu, \tau_\omega$ are hyper-parameters that control the strength of the prior, and $\mu_g^{old}, v_g^{old}; \omega_g^{old}$ are hyper-parameters inherited from the baseline acoustic model. Assume that the prior for the remaining parameters are uniform and $P(\mathcal{H}) \propto P(\Xi)$. To estimate the acoustic model parameters, maximize the Bayesian likelihood $$P(X|\mathcal{H})P(\mathcal{H}). \quad (13)$$

Thus the Bayesian log likelihood is $\log P(X|\mathcal{H}) + \log P(\Xi) + \text{const}$. Following "Maximum a posteriori estimation for multivariate gaussian mixture observations of markov chains," J. L. Gauvain and C. H. Lee, IEEE Transactions on Speech and Audio Processing, vol. 2, no. 2, pp. 291-298, 1994, the system uses the Expectation Maximization (EM) framework to formulate an auxiliary function $$Q(\Xi^{(k)}, \Xi^{(k-1)}) = \quad (14)$$

$$\sum_{gt} \gamma_g(x_t) \log \frac{\omega_g^{(k)} N(x_t; \mu_g^{(k)}, v_g^{(k)})}{\omega_g^{(k-1)} N(x_t; \mu_g^{(k-1)}, v_g^{(k-1)})} + \log\frac{P(\Xi^{(k)})}{P(\Xi^{(k-1)})}.$$

Here the system can use $\gamma_g(x_t) = P(g|\Xi^{(k-1)}, x_t)$ for the gaussian posterior at time t. The auxiliary functions in such a way that it yields a lower bound of the log likelihood. Furthermore, maximizing Q with respect to $\Xi^{(k)}$ leads to a larger log likelihood. Consequently, terms can be dropped that only depend on $\Xi^{(k-1)}$, leading to $Q(\Xi^{(k)}, \Xi^{(k-1)}) = \Sigma_g L(\omega_g^{(k)}, \mu_g^{(k)}, v_g^{(k)}) + R(\omega_g^{(k)}, \mu_g^{(k)}, v_g^{(k)}) + \text{const}$, where $$L(\omega_g, \mu_g, v_g) = \sum_t \gamma_g(x_t) \log(\omega_g N(x_t; \mu_g, v_g)) \quad (15)$$

and $$R(\omega_g, \mu_g, v_g) = \log P(\mu_g, v_g | \mu_g^{old}, v_g^{old}, \tau_\mu, \tau_\nu) + \log P(\omega_g | \omega_g^{old}, \tau_\omega). \quad (16)$$

In some embodiments, the system can use a Bayesian prior that is a special case of the more general Bayesian prior discussed in "Maximum a posteriori estimation for multivariate gaussian mixture observations of markov chains." The system can also use an I-smoothing framework, "Discriminative training for large vocabulary speech recognition," D. Povey, Ph.D. dissertation, Cambridge University, 2003, with a simple regularizer, such as one described in "Discriminative training for full covariance models," P. A. Olsen, V. Goel, and S. J. Rennie, in ICASSP 2011, Prague, Czech Republic, 2011, pp. 5312-5315, $$R(\omega_g, \mu_g, v_g) = -D(\mathcal{N}(\mu_g^{old}, v_g^{old}) \| \mathcal{N}(\mu_g, v_g)) \quad (17)$$

The corresponding log likelihood can be written:

$$L(\omega_g, \mu_g, v_g) = T_g\left(\log\omega_g + \sum_{i=1}^d \frac{\mu_{gi} s_{1gi}}{v_{gi}} - \frac{1}{2}\left(\frac{s_{2gi} + \mu_{gi}^2}{v_{gi}} + \log(2\pi v_{gi})\right)\right).$$

Here $T_g$ is the posterior count $T_g = \Sigma_t \gamma_g(x_t)$ and $s_{1gi}, s_{2gi}$ are the sufficient statistics:

$$s_{1gi} = \frac{1}{T_g} \sum_t \gamma_g(x_t) x_{ti}, \quad s_{2gi} = \frac{1}{T_g} \sum_t \gamma_g(x_t) x_{ti}^2.$$

Having now formulated the MAP auxiliary objective function, the system can make some simplifications. Since the auxiliary objective function decouples across gaussians and dimensions the system can drop the indices g and i. Also, sparsity on $\omega_g$ can optionally be ignored. Thus, $$L(\mu, v; s_1, s_2) = \frac{T\mu s_1}{v} - \frac{T}{2}\left(\frac{s_2 + \mu^2}{v} + \log(2\pi v)\right).$$

One more simplification can be useful to use the exponential family representation:

$$L(\theta;s) = s^\tau\theta - \log Z(\theta), \quad (18)$$

where $s=(s_1, s_2)^\tau$. In the exponential family representation the penalty term can be written $$R(\theta) = -\tau D(N(\mu^{old}, v^{old}) \| N(\mu, v)) \quad (19)$$
$$= -\tau \log Z(\theta) + \tau\theta^\tau E_{\theta old}[\phi(x)] + const.$$

Defining $s^{old} = E_{\theta old}[\phi(x)]$ yields the Bayesian auxiliary objective:

$$Q(\theta) = L(\theta; s) + R(\theta) \quad (20)$$
$$= \theta^\tau(Ts + \tau s^{old}) - (T+\tau)\log Z(\theta) + const$$
$$= (T+\tau)L(\theta; s^{MAP}) + const,$$

where $$s^{MAP} = \frac{Ts + \tau s^{old}}{T+\tau}.$$

In other words, the auxiliary MAP objective function simplifies to the maximum likelihood objective function, but with the sufficient statistics replaced by smooth statistics $s^{MAP}$.

The system can then use sparse constraints to generate acoustic model adaptation data. This can include restricting parameter movement, such as with an $l_0$ normalizer. In one embodiment, sparsity is induced based on a constrained MAP problem. Maximize $$\sum_{gi}(T_g + \tau)L(\theta_{gi}; s_{gi}^{MAP}) \quad (21)$$

subject to $$N = \sum_{gi} \|\theta_{gi} - \theta_{gi}^{old}\|_0, \quad (22)$$

where $\|\theta\|_0 = \#\{j : \theta_j \neq 0\}$ is the counting norm. The vector $\theta_{gi}$ is the parameter vector $\theta_{gi} = (\psi_{gi}, -p_{gi}/2)^\tau$ for dimension $i$ of gaussian $g$. This problem can be solved exactly. First note that for each term $L(\theta; s^{MAP})$, the system can use $\|\theta - \theta^{old}\|_0 \in \{0, 1, 2\}$ four ways. (1) $\psi = \psi^{old}$, $p = p^{ols}$. (2) $\psi \neq \psi^{old}$, $p = p^{old}$, (3) $\psi = \psi^{old}$, $p \neq p^{old}$ or (4) $\psi \neq \psi^{old}$, $p \neq p^{old}$. For each of the four possibilities the log likelihood $L(\theta; s^{MAP})$ can be maximized analytically. Once the log likelihood is known for each of the three sparsity levels, for each dimension and for each gaussian, the problem can be solved by use of the Viterbi algorithm. Another way to solve the problem is to consider introducing the Lagrange multiplier $\lambda$ and maximize the Lagrangian $$L(\Theta; \lambda) = \sum_{gi}(T_g + \tau)L(\theta_{gi}; s_{gi}^{MAP}) - \lambda\sum_{gi}\|\theta_{gi} - \theta_{gi}^{old}\|_0$$

with respect to $\Theta$ for each $\lambda$. By fixing the value of $\lambda$, then the problem once again decouples across dimensions, which maximizes each of the problems $$(T_g+\tau)L(\theta_{gi}; s_{gi}^{MAP}) - \lambda\|\theta_{gi} - \theta_{gi}^{old}\|_0 \quad (23)$$

separately. A subsequent step then involves a binary search to find the value of $\lambda$ that gives exactly N parameter changes. This second method can use sparsity promoting $\|\cdot\|_0$ penalty. The problem can be treated the same way by using moment variables, $\Xi$, instead of exponential family variables, $\Theta$.

Basically, in restricting parameter movement, the system counts how many or how much restriction there is. For example, if a parameter moves then it is counted as "one," and if a parameter does not move and is counted as "zero." It is counting a number of parameters that move or counting how many parameters have changed. This can include any acoustic parameter within the baseline acoustic model.

Embodiments can use sparsity promoting regularizers. As noted above, sparsity can be imposed by adding the $\|\cdot\|_0$ penalty to the MAP auxiliary objective function. The system can modify the penalty term $$R(\theta) = -\tau D(\theta^{old}\|\theta) - \lambda\|\theta - \theta^{old}\|_q$$

for $q=0$ and $q=1$. These two cases are beneficial in that they are values for which the system can provide an analytic solution to the maximum penalized likelihood problem. The case $q=1$ leads to a continuous and convex penalty that promotes sparsity in the differences. $q=0$ also promotes sparsity, but yields a penalty that is neither convex nor continuous. For representation in terms of moment variables, the system can consider $$R(\xi) = -\tau D(\mathcal{N}_{(\mu^{old}, v^{old})} \| \mathcal{N}_{(\mu, v)}) - \lambda\|\xi - \xi^{old}\|_q$$

for $q=0$ and $q=1$. In this case neither $q=1$ nor $q=0$ lead to a convex function, but both cases can nonetheless be solved analytically by partitioning the domain into pieces where the function is continuously differentiable.

For $t=0$, the case of $q=1$ can be interpreted as a Bayesian likelihood with a Laplacian prior distribution. For $\tau=0$, $q=0$, there is no Bayesian interpretation as $e^{-\|\theta-\theta old\|_0}$ cannot be interpreted as a distribution. This penalty, however, is still valid. This penalty can give the maximum likelihood solution given that a constrained number of parameters can change (and $\lambda$ controls that number).

The per gaussian, per dimension, auxiliary penalized log can then be written $$Q(\theta) = (T+\tau)L(\theta; s^{MAP}) - \lambda\|\theta - \theta^{old}\|_q \quad (24)$$

for the exponential family representation, and $$Q(\xi) = (T+\tau)L(\xi; s^{MAP}) - \lambda\|\xi - \xi^{old}\|_q \quad (25)$$

for the moment variable case.

Note that q is usually greater than zero, or less than or equal to one. That is, $l_0$ and $l_1$ are sparse promoting. Using these regularizers can restrict some of the parameter movement. In many calculations, most of the parameters will not move, but only a small amount of the parameters will move, such as less than 10 percent or less than one percent.

The system, then essentially identifies what patterns have changed in a person's speech relative to a generic or default acoustic model, and then those changes (or the most relevant changes) are stored.

For optimization, instead of maximizing the auxiliary objective function, it can be beneficial to minimize the function $$F(\theta) = -2L(\theta; s^{MAP}) + \alpha\|\theta - \theta^{old}\|_q \quad (26)$$

for the exponential family representation, and $$F(\xi) = -2L(\xi; s^{MAP}) + \alpha\|\xi - \xi^{old}\|_q. \quad (27)$$

for the moment variable case. By choosing $$\alpha = \frac{2\lambda}{T+\tau},$$

minimizing F can be equivalent to maximizing Q, but the variables T, τ, and λ have been combined into α.

Thus, the baseline acoustic model can be represented by a gaussian mixture model, in which the parameters are basically gaussian means and variances to solve the optimization problem.

For the $l_0$ constraint, the system can consider four different cases, and for the $l_1$ constraint, the system can consider nine different cases. FIGS. 2-7 detail four algorithms that can be used for implementing sparse MAP adaptation on acoustic data. For $l_0$ the constraint with moment variables the solution is given in the algorithm of FIG. 2, and for exponential family variables this solution is given in the algorithm of FIG. 3. For $l_1$ with exponential family variables the solution is depicted in the algorithm of FIGS. 6-7. For the $l_1$ case with moment variables, the solution to locate all the local minima is depicted in the algorithm shown in FIGS. 4-5. Thus there are two different forms of input when l is 0, and two different forms of input when l is 1. In other embodiments, $l_0$ and $l_1$ can be combined or used simultaneously. Essentially, these algorithms can be used to identify which parameters of an acoustic speech model are changing, and by how much they are changing, in a data-driven manner.

These algorithms differ in the form of input. Acoustic models can be optionally represented in two different forms, and a selected representation has an implication on the parameter movement. Both representations can be roughly equal in output. Thus each algorithm can yield a desired level of sparsity and control. There is essentially a "knob" or controller. By setting the knob to "zero" then every parameter would want to move, resulting in adaptation data equal to the number of parameters in the baseline acoustic model. Conversely, setting the knob to infinity results in no parameter movement. Because they are regularizers, they can control parameter movement.

Depending on what user specific perturbations a given system can afford to store, a corresponding setting can be selected that results in a particular number of values or parameters that change. This could be a specific quantity/amount of parameters that change based either on available storage space and/or a satisfactory word error rate. Whether the parameter output is based on an amount of parameters or data storage availability, the system can store only those parameters in an associated user profile. This can include identifying which parameters affect speech recognition the most. For example, the parameter λ can be used to control a threshold of how many parameters are desired to change. In a more specific example, if a given goal is only to change 2% of the parameters and preserve 98% of the parameters from the baseline acoustic model, then the λ value will yield that. Alternatively, if a corresponding hosted speech recognition system is limited to a specific amount of storage, such as 1% for each speaker profile, then λ can be set to return a corresponding level of sparsity. After collecting more user acoustic data, the model can be updated.

Thus, the baseline acoustic model can be represented by a gaussian mixture model, in which the parameters are basically gaussian means and variances to solve the optimization problem.

Even MAP adaptation can suffer from lack of data. Although it is possible to achieve lower word error rates with just a handful of spoken utterances (a few seconds to a few minutes), the system can achieve higher accuracy with amounts of data in the range of 20 minutes to ten hours.

FIGS. 12-13 detail an additional algorithm that can be used for implementing sparse MAP adaptation on acoustic data. Specifically, FIGS. 12-13 show a method to analytically identify a global optimum with relatively little computation cost added to the sparse regularizer. This algorithm minimized a negative log likelihood instead of maximizing a Bayesian likelihood.

Figure 11:
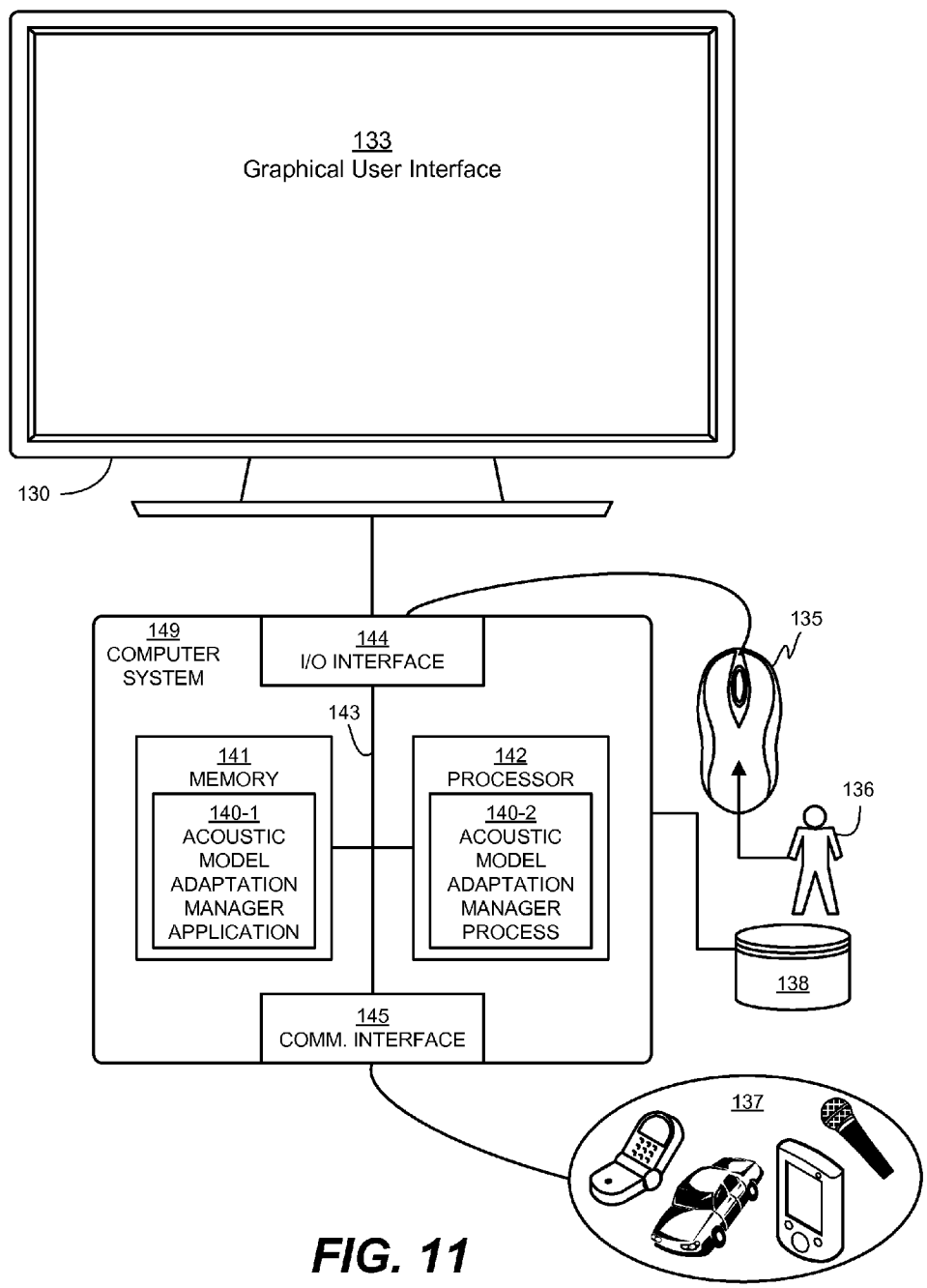
FIG. 11 is an example block diagram of an acoustic model adaptation manager operating in a computer/network environment according to embodiments herein.

FIG. 11 illustrates an example block diagram of an acoustic model adaptation manager 140 operating in a computer/network environment according to embodiments herein. In summary, FIG. 11 shows computer system 149 displaying a graphical user interface 133 that provides an acoustic model adaptation manager interface. Computer system hardware aspects of FIG. 11 will be described in more detail following a description of the flow charts.

Functionality associated with acoustic model adaptation manager 140 will now be discussed via flowcharts and diagrams in FIG. 8 through FIG. 10. For purposes of the following discussion, the acoustic model adaptation manager 140 or other appropriate entity performs steps in the flowcharts.

Figure 8:
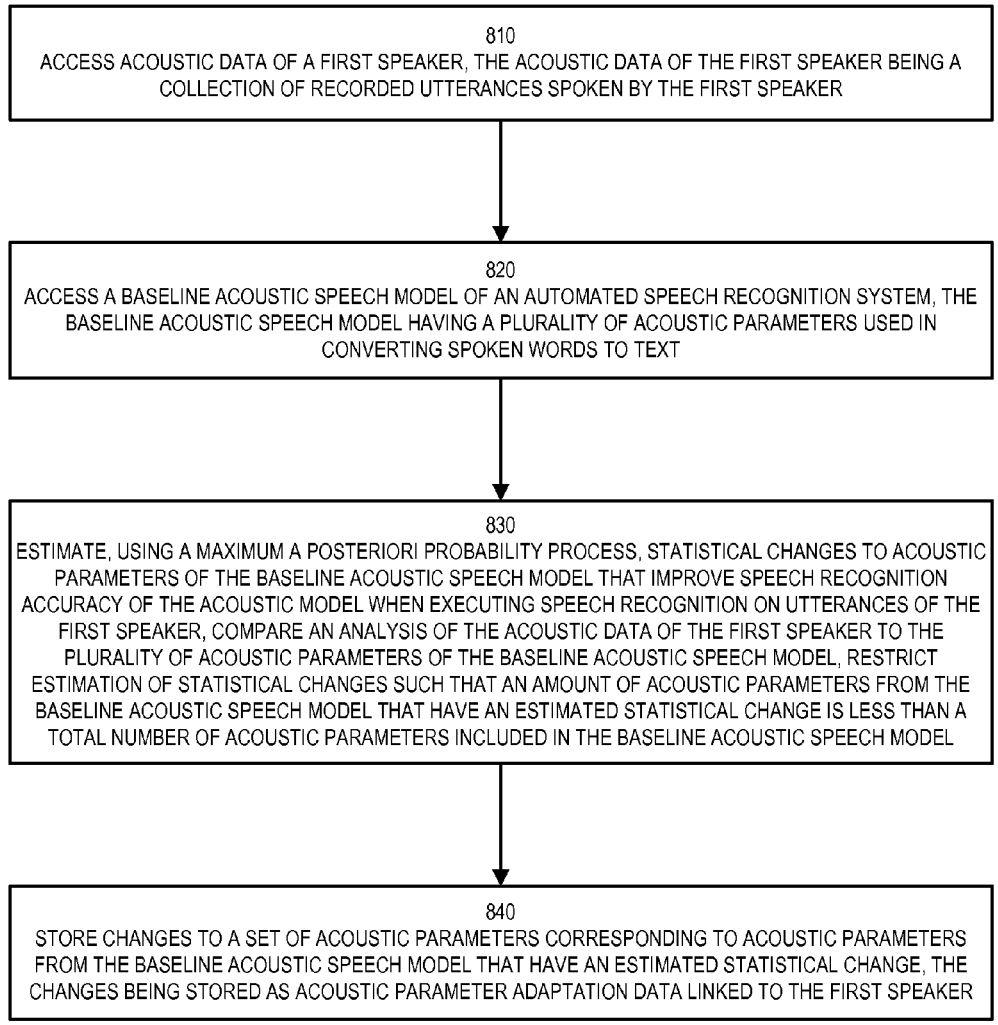
FIG. 8 is a flowchart illustrating an example of a process supporting sparse MAP adaptation for generating acoustic parameter adaptation data according to embodiments herein.

Now describing embodiments more specifically, FIG. 8 is a flow chart illustrating embodiments disclosed herein. In step 810, acoustic model adaptation manager access acoustic data of a first speaker. The acoustic data of the first speaker includes a collection or amount of recorded utterances spoken by the first speaker. Such acoustic data can be initially recorded from past calls or dictation sessions, etc.

In step 820, the acoustic model adaptation manager accesses a baseline acoustic speech model of an automated speech recognition system. The baseline acoustic speech model has a plurality of acoustic parameters used in converting spoken words to text. Such a baseline acoustic speech model can be any generic or initial model, which can be trained on a single user, or a plurality of users.

In step 830, the acoustic model adaptation manager estimates—using a maximum a posteriori probability process—statistical changes to acoustic parameters of the baseline acoustic speech model that improve speech recognition accuracy of the acoustic model, such as when executing speech recognition on utterances (subsequent utterances) of the first speaker. Using this maximum a posteriori probability process can include comparing an analysis of the acoustic data of the first speaker to the plurality of acoustic parameters of the baseline acoustic speech model. Using the maximum a posteriori probability process includes restricting estimation of statistical changes such that an amount of acoustic parameters from the baseline acoustic speech model that have an estimated statistical change is less than a total number of acoustic parameters included in the baseline acoustic speech model. In other words, the system controls parameter movement using regularizer so that only a relatively small portion of the parameters move.

In step 840, the acoustic model adaptation manager store changes to a set of acoustic parameters corresponding to acoustic parameters from the baseline acoustic speech model that have an estimated statistical change. The changes are stored as acoustic parameter adaptation data linked to the first speaker, such as in a user profile.

Figure 9:
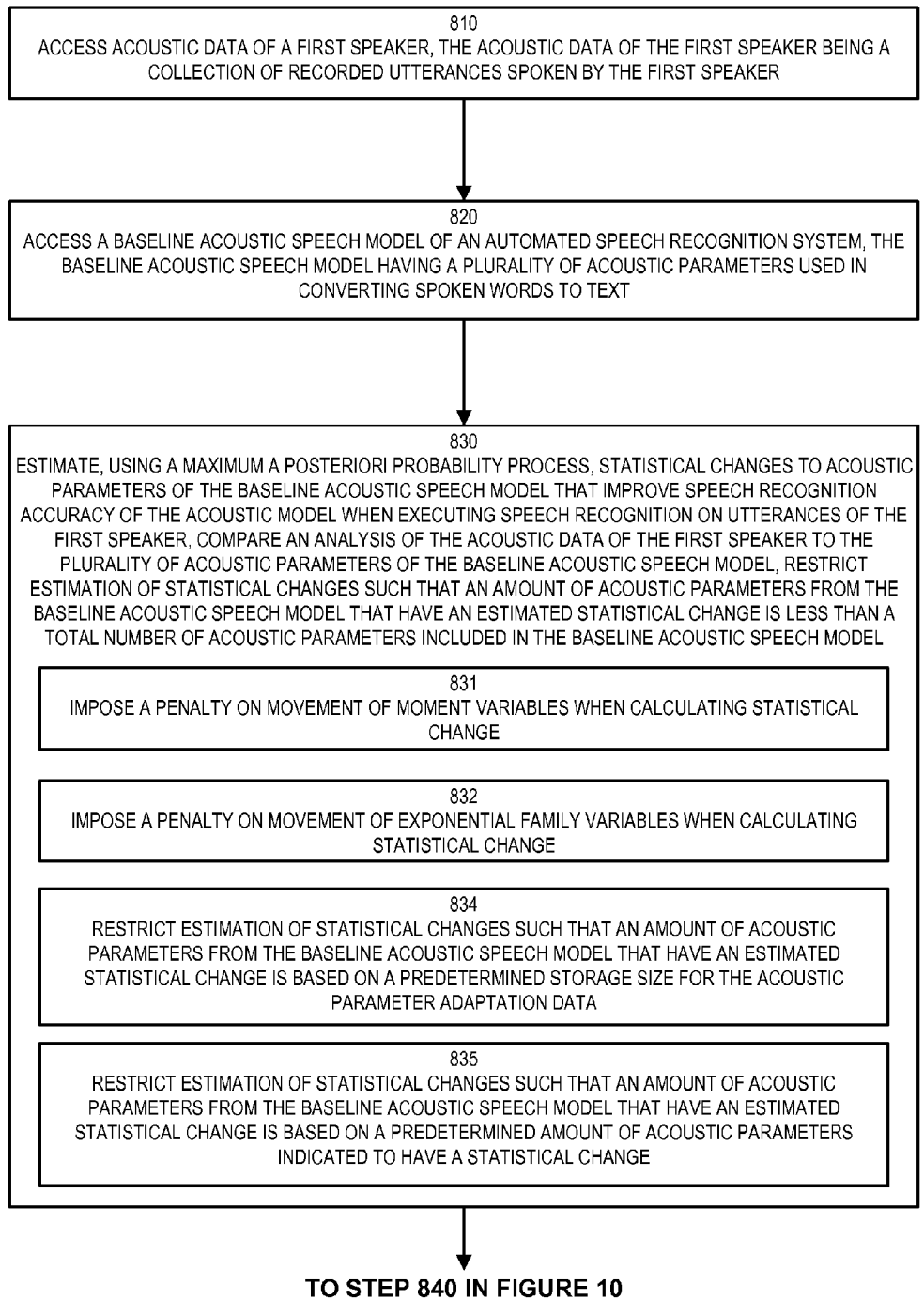
FIGS. 9-10 are a flowchart illustrating an example of a process supporting sparse MAP adaptation for generating acoustic parameter adaptation data according to embodiments herein.
Figure 10:
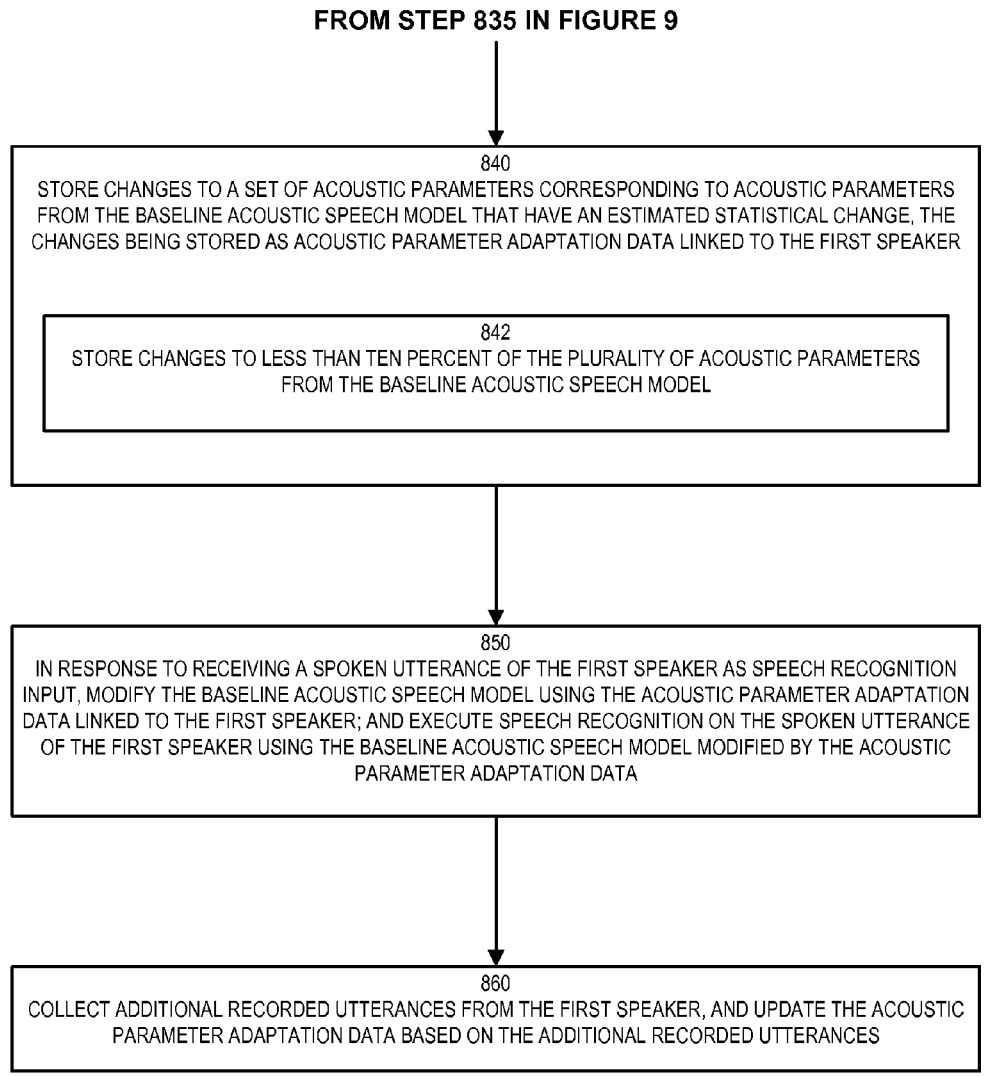

FIGS. 9-10 include a flow chart illustrating additional and/or alternative embodiments and optional functionality of the acoustic model adaptation manager 140 as disclosed herein.

In step 810, acoustic model adaptation manager access acoustic data of a first speaker. The acoustic data of the first speaker includes a collection or amount of recorded utterances spoken by the first speaker.

In step 820, the acoustic model adaptation manager accesses a baseline acoustic speech model of an automated speech recognition system. The baseline acoustic speech model has a plurality of acoustic parameters used in converting spoken words to text.

In step 830, the acoustic model adaptation manager estimates—using a maximum a posteriori probability process—statistical changes to acoustic parameters of the baseline acoustic speech model that improve speech recognition accuracy of the acoustic model, such as when executing speech recognition on utterances (subsequent utterances) of the first speaker. Using this maximum a posteriori probability process can include comparing an analysis of the acoustic data of the first speaker to the plurality of acoustic parameters of the baseline acoustic speech model. Using the maximum a posteriori probability process includes restricting estimation of statistical changes such that an amount of acoustic parameters from the baseline acoustic speech model that have an estimated statistical change is less than a total number of acoustic parameters included in the baseline acoustic speech model.

In step 831, the acoustic model adaptation manager restricts estimation of statistical changes by imposing a penalty on movement of moment variables.

In step 832, the acoustic model adaptation manager restricts estimation of statistical changes by imposing a penalty on movement of exponential family variables.

In step 834, the acoustic model adaptation manager restricts estimation of statistical changes by restricting estimation of statistical changes such that an amount of acoustic parameters from the baseline acoustic speech model that have an estimated statistical change is based on a predetermined storage size for the acoustic parameter adaptation data. For example, if a particular hosted speech recognition application has 22 million users and a fixed amount of available storage space to divide among the 22 million users, then after determining an amount of available storage space for each user, the acoustic model adaptation manager can adjust parameter movement so that the a data size for a total number of parameters having movement is less than the available storage space for that user.

In step 835, the acoustic model adaptation manager restricts estimation of statistical changes by restricting estimation of statistical changes such that an amount of acoustic parameters from the baseline acoustic speech model that have an estimated statistical change is based on a predetermined amount of acoustic parameters indicated to have a statistical change. For example, if an administrator desires the 100 best parameter changes to be stored, then the acoustic model adaptation manager adjusts parameter movement computation to yield 100 parameters having movement.

In step 840, the acoustic model adaptation manager store changes to a set of acoustic parameters corresponding to acoustic parameters from the baseline acoustic speech model that have an estimated statistical change. The changes are stored as acoustic parameter adaptation data linked to the first speaker, such as in a user profile.

In step 842, the acoustic model adaptation manager stores changes to less than ten percent of the plurality of acoustic parameters from the baseline acoustic speech model. In other embodiments, this amount can be less than one percent of acoustic parameters.

In step 850, in response to receiving a spoken utterance of the first speaker as speech recognition input, the system modifies the baseline acoustic speech model using the acoustic parameter adaptation data linked to the first speaker. The system then executes speech recognition on the spoken utterance of the first speaker using the baseline acoustic speech model modified by the acoustic parameter adaptation data. In other words, the system customizes speech recognition to the specific user.

In step 860, the system collects additional recorded utterances from the first speaker, and updates the acoustic parameter adaptation data based on the additional recorded utterances.

Continuing with FIG. 11, the following discussion provides a basic embodiment indicating how to carry out functionality associated with the acoustic model adaptation manager 140 as discussed above. It should be noted, however, that the actual configuration for carrying out the acoustic model adaptation manager 140 can vary depending on a respective application. For example, computer system 149 can include one or multiple computers that carry out the processing as described herein.

In different embodiments, computer system 149 may be any of various types of devices, including, but not limited to, a cell phone, a personal computer system, desktop computer, laptop, notebook, or netbook computer, tablet computer, mainframe computer system, handheld computer, workstation, network computer, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the acoustic model adaptation manager 140 of computer system 149 to communicate over a network and, if necessary, retrieve any data required to create views, process content, communicate with a user, etc. according to embodiments herein.

As shown, memory system 141 is encoded with acoustic model adaptation manager 140-1 that supports functionality as discussed above and as discussed further below. Acoustic model adaptation manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the acoustic model adaptation manager 140-1. Execution of the acoustic model adaptation manager 140-1 produces processing functionality in acoustic model adaptation manager process 140-2. In other words, the acoustic model adaptation manager process 140-2 represents one or more portions of the acoustic model adaptation manager 140 performing within or upon the processor 142 in the computer system 149.

It should be noted that, in addition to the acoustic model adaptation manager process 140-2 that carries out method operations as discussed herein, other embodiments herein include the acoustic model adaptation manager 140-1 itself (i.e., the un-executed or non-performing logic instructions and/or data). The acoustic model adaptation manager 140-1 may be stored on a non-transitory, tangible computer-readable storage medium including computer readable storage media such as floppy disk, hard disk, optical medium, etc. According to other embodiments, the acoustic model adaptation manager 140-1 can also be stored in a memory type system such as in firmware, read only memory (ROM), or, as in this example, as executable code within the memory system 141.

In addition to these embodiments, it should also be noted that other embodiments herein include the execution of the acoustic model adaptation manager 140-1 in processor 142 as the acoustic model adaptation manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method for speech recognition, the computer-implemented method comprising:
    accessing acoustic data of a first speaker, the acoustic data of the first speaker being a collection of recorded utterances spoken by the first speaker;
    accessing a baseline acoustic speech model of an automated speech recognition system, the baseline acoustic speech model having a plurality of acoustic parameters used in converting spoken words to text;
    estimating, using a maximum a posteriori probability process, statistical changes to acoustic parameters of the baseline acoustic speech model that improve speech recognition accuracy of the acoustic model when executing speech recognition on utterances of the first speaker, wherein using the maximum a posteriori probability process includes comparing an analysis of the acoustic data of the first speaker to the plurality of acoustic parameters of the baseline acoustic speech model, wherein using the maximum a posteriori probability process includes restricting estimation of statistical changes such that an amount of acoustic parameters from the baseline acoustic speech model that have an estimated statistical change is less than a total number of acoustic parameters included in the baseline acoustic speech model; and
    storing changes to a set of acoustic parameters corresponding to acoustic parameters from the baseline acoustic speech model that have an estimated statistical change, the changes being stored as acoustic parameter adaptation data linked to the first speaker.

2. The computer-implemented method of claim 1, wherein restricting estimation of statistical changes includes imposing a penalty on movement of moment variables when calculating statistical change.

3. The computer-implemented method of claim 1, wherein restricting estimation of statistical changes includes imposing a penalty on movement of exponential family variables when calculating statistical change.

4. The computer-implemented method of claim 1, wherein restricting estimation of statistical changes includes restricting estimation of statistical changes such that an amount of acoustic parameters from the baseline acoustic speech model that have an estimated statistical change is based on a predetermined storage size for the acoustic parameter adaptation data.

5. The computer-implemented method of claim 1, wherein restricting estimation of statistical changes includes restricting estimation of statistical changes such that an amount of acoustic parameters from the baseline acoustic speech model that have an estimated statistical change is based on a predetermined amount of acoustic parameters indicated to have a statistical change.

6. The computer-implemented method of claim 1, further comprising:
    in response to receiving a spoken utterance of the first speaker as speech recognition input, modifying the baseline acoustic speech model using the acoustic parameter adaptation data linked to the first speaker; and
    executing speech recognition on the spoken utterance of the first speaker using the baseline acoustic speech model modified by the acoustic parameter adaptation data.

7. The computer-implemented method of claim 6, further comprising:
    collecting additional recorded utterances from the first speaker, and updating the acoustic parameter adaptation data based on the additional recorded utterances.

8. The computer-implemented method of claim 1, wherein storing changes to the set of acoustic parameters includes storing changes to less than ten percent of the plurality of acoustic parameters from the baseline acoustic speech model.

9. A computer system for automatic speech recognition, the computer system comprising:
    a processor; and
    a memory coupled to the processor, the memory storing instructions that, when executed by the processor, cause the system to perform the operations of:
        accessing acoustic data of a first speaker, the acoustic data of the first speaker being a collection of recorded utterances spoken by the first speaker;
        accessing a baseline acoustic speech model of an automated speech recognition system, the baseline acoustic speech model having a plurality of acoustic parameters used in converting spoken words to text;
        estimating, using a maximum a posteriori probability process, statistical changes to acoustic parameters of the baseline acoustic speech model that improve speech recognition accuracy of the acoustic model when executing speech recognition on utterances of the first speaker, wherein using the maximum a posteriori probability process includes comparing an analysis of the acoustic data of the first speaker to the plurality of acoustic parameters of the baseline acoustic speech model, wherein using the maximum a posteriori probability process includes restricting estimation of statistical changes such that an amount of acoustic parameters from the baseline acoustic speech model that have an estimated statistical change is less than a total number of acoustic parameters included in the baseline acoustic speech model; and
        storing changes to a set of acoustic parameters corresponding to acoustic parameters from the baseline acoustic speech model that have an estimated statistical change, the changes being stored as acoustic parameter adaptation data linked to the first speaker.

10. The computer system of claim 9, wherein restricting estimation of statistical changes includes imposing a penalty on movement of moment variables when calculating statistical change.

11. The computer system of claim 9, wherein restricting estimation of statistical changes includes imposing a penalty on movement of exponential family variables when calculating statistical change.

12. The computer system of claim 9, wherein restricting estimation of statistical changes includes restricting estimation of statistical changes such that an amount of acoustic parameters from the baseline acoustic speech model that have an estimated statistical change is based on a predetermined storage size for the acoustic parameter adaptation data.

13. The computer system of claim 9, wherein restricting estimation of statistical changes includes restricting estimation of statistical changes such that an amount of acoustic parameters from the baseline acoustic speech model that have an estimated statistical change is based on a predetermined amount of acoustic parameters indicated to have a statistical change.

14. The computer system of claim 9, the memory storing further instructions that, when executed by the processor, cause the system to perform the operations of:
in response to receiving a spoken utterance of the first speaker as speech recognition input, modifying the baseline acoustic speech model using the acoustic parameter adaptation data linked to the first speaker; and
executing speech recognition on the spoken utterance of the first speaker using the baseline acoustic speech model modified by the acoustic parameter adaptation data.

15. The computer system of claim 14, the memory storing further instructions that, when executed by the processor, cause the system to perform the operations of:
collecting additional recorded utterances from the first speaker, and updating the acoustic parameter adaptation data based on the additional recorded utterances.

16. The computer system of claim 9, wherein storing changes to the set of acoustic parameters includes storing changes to less than ten percent of the plurality of acoustic parameters from the baseline acoustic speech model.

17. A computer program product including a non-transitory computer-storage medium having instructions stored thereon for processing data information, such that the instructions, when carried out by a processing device, cause the processing device to perform the operations of:
accessing acoustic data of a first speaker, the acoustic data of the first speaker being a collection of recorded utterances spoken by the first speaker;
accessing a baseline acoustic speech model of an automated speech recognition system, the baseline acoustic speech model having a plurality of acoustic parameters used in converting spoken words to text;
estimating, using a maximum a posteriori probability process, statistical changes to acoustic parameters of the baseline acoustic speech model that improve speech recognition accuracy of the acoustic model when executing speech recognition on utterances of the first speaker, wherein using the maximum a posteriori probability process includes comparing an analysis of the acoustic data of the first speaker to the plurality of acoustic parameters of the baseline acoustic speech model, wherein using the maximum a posteriori probability process includes restricting estimation of statistical changes such that an amount of acoustic parameters from the baseline acoustic speech model that have an estimated statistical change is less than a total number of acoustic parameters included in the baseline acoustic speech model; and
storing changes to a set of acoustic parameters corresponding to acoustic parameters from the baseline acoustic speech model that have an estimated statistical change, the changes being stored as acoustic parameter adaptation data linked to the first speaker.

18. The computer program product of claim 17, wherein restricting estimation of statistical changes includes imposing a penalty on movement of moment variables when calculating statistical change; and wherein restricting estimation of statistical changes also includes imposing a penalty on movement of exponential family variables when calculating statistical change.

19. The computer program product of claim 17, wherein restricting estimation of statistical changes includes restricting estimation of statistical changes such that an amount of acoustic parameters from the baseline acoustic speech model that have an estimated statistical change is based on a predetermined storage size for the acoustic parameter adaptation data.

20. The computer program product of claim 17, having further instructions stored thereon for processing data information, such that the instructions, when carried out by a processing device, cause the processing device to perform the operations of further comprising:
in response to receiving a spoken utterance of the first speaker as speech recognition input, modifying the baseline acoustic speech model using the acoustic parameter adaptation data linked to the first speaker;
executing speech recognition on the spoken utterance of the first speaker using the baseline acoustic speech model modified by the acoustic parameter adaptation data; and
collecting additional recorded utterances from the first speaker, and updating the acoustic parameter adaptation data based on the additional recorded utterances.

* * * * *